United States Patent [19]

Kaiser

[11] Patent Number: 5,364,154
[45] Date of Patent: Nov. 15, 1994

[54] LIFTABLE RIGID TRUCK BED COVER

[75] Inventor: Robert Kaiser, Mt Laurel, N.J.

[73] Assignee: Sierra Line Products, Inc., Cherry Hill, N.J.

[21] Appl. No.: 90,341

[22] Filed: Jul. 9, 1993

[51] Int. Cl.⁵ ............................ B60P 7/02; B60P 3/34
[52] U.S. Cl. .................... 296/100; 296/105; 296/165; 135/88.05; 272/277
[58] Field of Search ............... 296/100, 102, 105, 118, 296/164, 165; 49/394; 135/88, 119; 292/262, 266, 271, 272, 273, 277

[56] References Cited

U.S. PATENT DOCUMENTS

| | | | |
|---|---|---|---|
| 2,781,560 | 2/1957 | Ziesmer | 49/394 X |
| 3,151,908 | 10/1964 | Horst | 296/100 |
| 3,155,423 | 11/1964 | Cripe | 296/100 |
| 3,231,305 | 1/1966 | Beerman | 135/88 X |
| 3,420,570 | 1/1969 | Kunz | 296/100 |
| 3,649,073 | 3/1972 | Whittemore | 296/100 |
| 3,785,698 | 1/1974 | Dean | 296/100 |
| 3,894,765 | 7/1975 | Bourke et al. | 135/88 X |
| 3,923,334 | 12/1975 | Key | 135/88 X |
| 4,083,596 | 4/1978 | Robertson | 296/100 |
| 4,456,289 | 6/1984 | Badiali | 292/50 X |
| 4,768,824 | 9/1988 | Andonian | 296/165 |
| 4,927,117 | 5/1990 | Gainey | 135/88 X |
| 5,033,787 | 7/1991 | Takada | 296/102 |
| 5,102,185 | 4/1992 | Lake | 296/165 |
| 5,203,055 | 4/1993 | Broadwater, Sr. | 135/119 X |
| 5,203,364 | 4/1993 | Koole | 296/100 X |

FOREIGN PATENT DOCUMENTS

650770 2/1929 France .................. 252/266
176122 2/1922 United Kingdom ........... 296/105

*Primary Examiner*—Dennis H. Pedder
*Attorney, Agent, or Firm*—Caesar, Rivise, Bernstein, Cohen & Pokotilow, Ltd.

[57] ABSTRACT

A liftable cover assembly for the bed of a truck having sidewalls and a tail gate. The cover assembly comprises a rigid cover panel sized to encompass the entire truck bed, plural support legs for the cover panel, a height establishing mechanism, and a locking mechanism. The support legs comprise a pair of generally U-shaped members pivotally mounted on the sidewalls and pivotally connected to the cover panel to enable the cover panel to be lifted from a lower or closed position, wherein it is horizontally disposed over the bed on the sidewalls and the tailgate, to a raised or open position, wherein it is disposed and held horizontally a predetermined distance above the sidewalls. The height establishing mechanism is adjustable to establish various predetermined distances that the cover may be disposed over the truck bed in the open position. The locking mechanism includes an actuatable handle and plural associated latches for locking the cover panel in the closed position. Plural gas-operated dash-pots are provided for assisting the lifting of the cover panel to the open position. The U-shaped members making up the support legs are releasably secured to the sidewalls of the truck to enable the cover panel and the U-shaped members to be removed as a unit from the truck bed, if desired. A tent-like curtain is provided for releasable suspension by the cover panel when it is in the open position to provide an enclosure for the truck bed.

16 Claims, 6 Drawing Sheets

LIFTABLE RIGID TRUCK BED COVER

BACKGROUND OF THE INVENTION

This invention relates generally to covers, and more particularly to covers for enclosing the beds of trucks.

Various covers for use in covering the bed of a pick-up truck are commercially available. Typically such covers are formed of a flexible, fabric material which is arranged to be releasably secured, e.g., such as by snaps or other similar type of fasteners, to the top surfaces of the truck bed's side walls and tail gate. Some covers comprise a fabric or some other material having a supporting frame to impart rigidity to the cover. Some covers are arranged to be pivotally mounted on the truck bed so that they can be pivoted up from a closed position in which they seal the truck bed, to an angularly oriented position for providing access to the interior of the truck bed.

While the covers of the prior art are generally suitable for their intended purposes they leave much to be desired from the various standpoints, such as, resistance to unauthorized entry, long term integrity, easy of mounting, easy of operation, adjustability, and ability to convert the truck into a camper-type vehicle.

OBJECTS OF THE INVENTION

Accordingly, it is a general object of this invention to provide a truck bed cover which overcomes the disadvantages of the prior art.

It is another object of this invention to provide a truck bed cover which is arranged to be readily mounted on or removed from a truck bed.

It is another object of this invention to provide a truck bed cover which is of rigid construction to provide good security against unauthorized access to the truck bed when the cover is closed.

It is another object of this invention to provide a truck bed cover which is arranged to be readily lifted to provide access into the interior of the truck bed.

It is another object of this invention to provide a truck bed cover which is arranged to be lifted horizontally to provide access into the interior of the truck bed.

It is another object of this invention to provide a truck bed cover which is arranged to be lifted horizontally to various predetermined heights with respect to the truck bed to provide different amounts of access into the interior of the truck bed.

It is another object of this invention to provide a truck bed cover, which when in an open position, is suitable for connecting a curtain structure to it to form a tent-like enclosure over the truck bed.

SUMMARY OF THE INVENTION

These and other objects of this invention are achieved by providing a liftable cover assembly for the bed of a truck having sidewalls and a tail gate. The cover assembly comprises a cover panel, plural support legs for the cover panel, height establishing means, and locking means. The support legs are coupled to the sidewalls and to the cover panel to enable the cover panel to be lifted from a closed (i.e., lower) position, wherein the cover panel is horizontally disposed over the bed on the sidewalls and the tailgate, to an open (i.e., raised) position, wherein the cover panel is disposed and held horizontally a predetermined distance above the sidewalls. The height establishing means cooperates with the cover panel and the support legs to establish the predetermined distance that the cover panel is located above the truck bed when in the open position. The locking means is actuatable to lock the cover panel in the closed position and to unlock the cover panel so that it can be raised to the open position.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
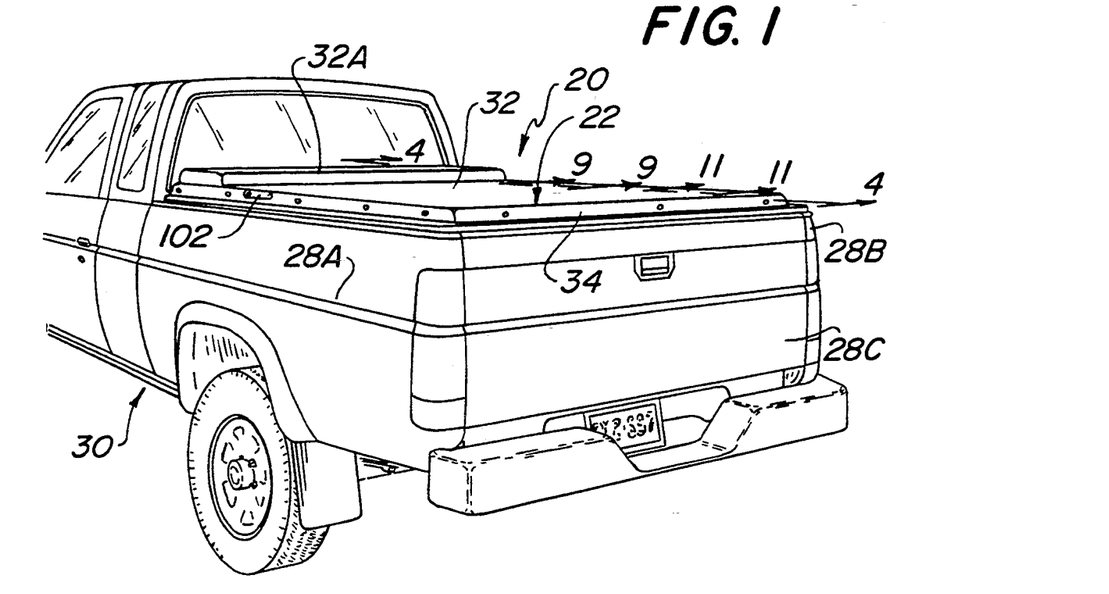
FIG. 1 is an isometric view of the rear end of a conventional pick-up truck showing the cover assembly of the subject invention in place in its closed or lowered position.
Figure 2:
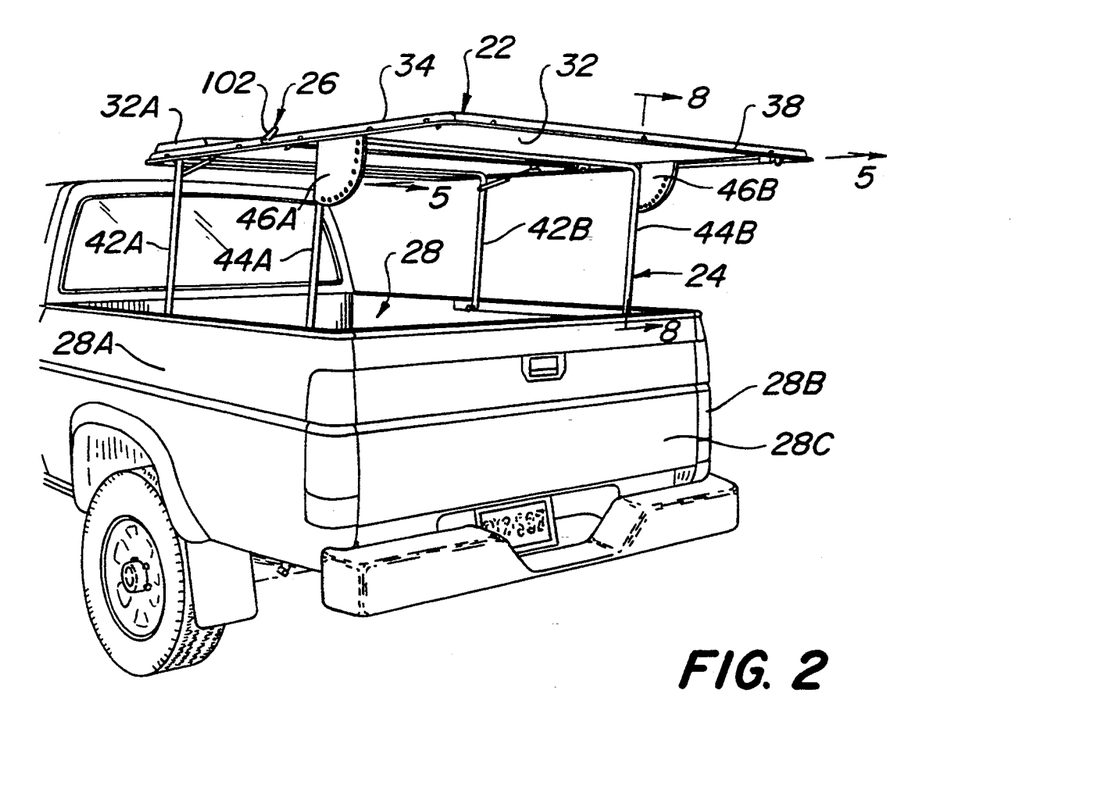
FIG. 2 is an isometric view, like that of FIG. 1, but showing the cover assembly of the subject invention in place in an open or raised position.

Referring now to various figures of the drawing where like reference numerals refer to like parts there is shown at 20 in FIG. 1, a truck bed cover assembly constructed in accordance with this invention. The cover assembly 20 basically comprises a rigid, impervious material, cover member 22, a mounting/support subassembly 24 (FIG. 2), and a locking subassembly 26 (FIG. 2). The cover member 20 is arranged to be releasably mounted, via the mounting/support subassembly 24, on the bed 28 (FIG. 2) of a conventional pick-up truck 30 and is movable between a closed position (shown in FIG. 1), wherein it abuts the top surfaces of the truck bed's sidewalls 28A and 28B and top surface of the truck's tail-gate 28C to render the interior of the truck bed inaccessible from the outside, and one of several "open" positions wherein it is spaced above the truck bed, and vice versa. The cover is arranged to be locked in the closed position by the locking subassembly 26 so that any materials or goods stored within the truck bed are protected from exposure to the elements or from theft or tampering by the impervious cover member 22.

The cover member 22 is arranged to be lifted horizontally to move it from the closed position to any one of the open positions. In each open position the cover is disposed horizontally a respective, predetermined, distance above the truck bed, and is held in place at that position by a portion of the frame subassembly to provide access to the interior of the truck bed from the space between the raised cover member and the sidewalls and tail gate of the truck bed. The height at which the cover member can be disposed and held above the truck bed is user-adjustable by a portion of the mounting/support subassembly 24 to be described later.

Figures 10, 11:
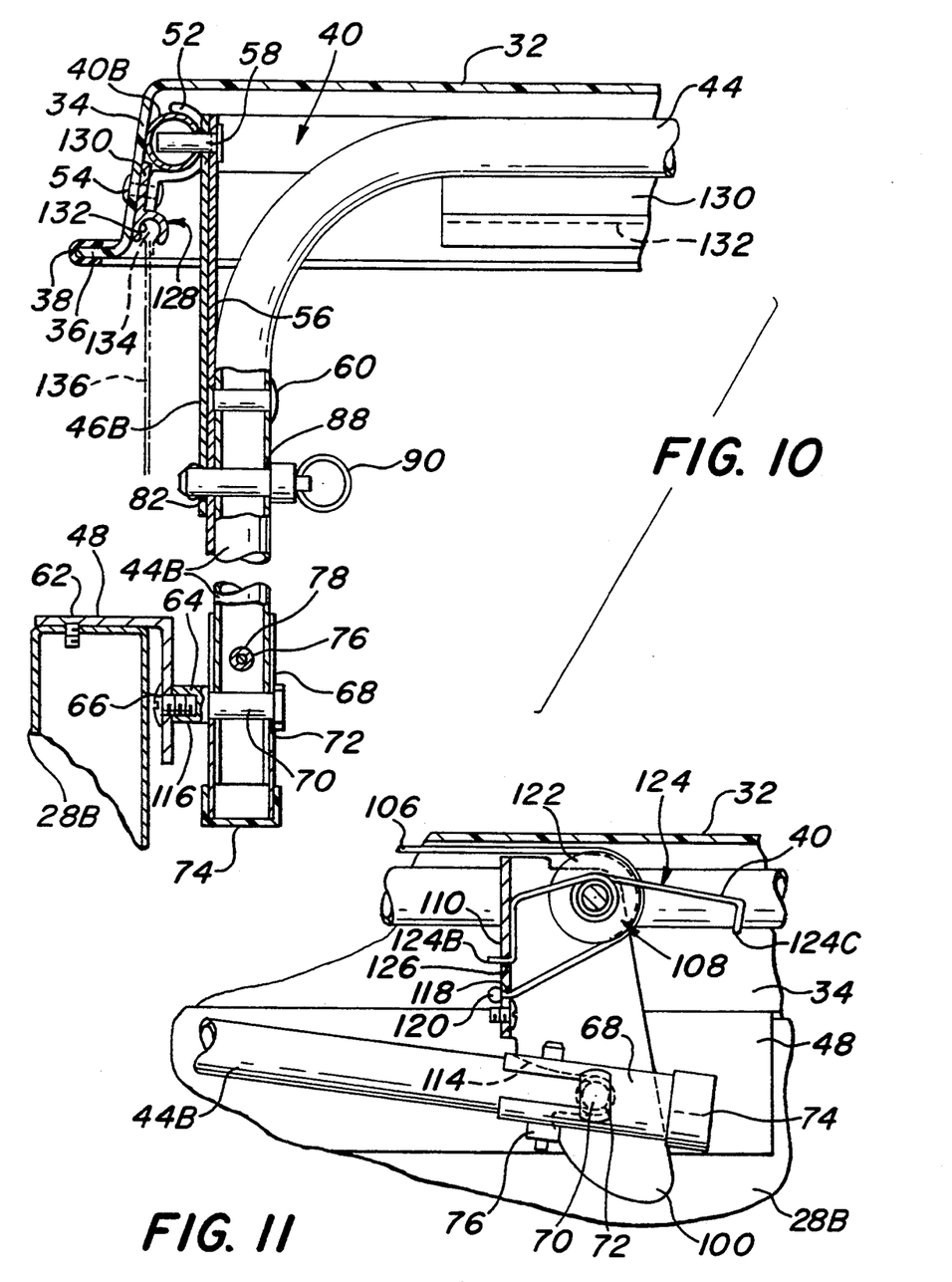
FIG. 10 is a sectional view taken along line 10—10 of FIG. 8.
FIG. 11 is an enlarged sectional view taken along line 11—11 of FIG. 1.

The cover member 22 is best seen in FIGS. 1, 2, 4, 5 and 10, and comprises an integral member, formed of a rigid, self-supporting, penetration-resistant material, e.g., fiberglass or plastic, having a generally planar top 32 and a downwardly projecting peripheral side wall 34 extending thereabout. The sidewall terminates in a horizontally disposed peripheral flange 36 (FIG. 10), whose free edge is covered by a peripheral U-shaped molding 38 (FIG. 10). The cover member 32 is sized and shaped so that its periphery conforms to the periphery of the bed of the truck to which it is to be secured. Thus, in the embodiment shown herein the cover member 22 is of rectangular shape.

The top 32 includes a raised section 32A at its front end to provide additional space thereunder when the cover is in the closed position to store in the truck bed any goods or materials whose height is greater than that of the sidewalls and tailgate of the truck bed.

The mounting/support subassembly 24 is shown clearly in FIGS. 4–7 and basically comprises a frame 40, a pair of generally U-shaped members 42 and 44, a height adjustment mechanism 46, and a pair of mounting brackets 48 including releasably securable pivoting mounts 50. The frame 40 is formed of a pair of tubular stock, e.g., aluminum, U-shaped members 40A and 40B which are secured together by a pair of tubular connectors 40C to form a hollow rectangular shaped frame. As can be seen clearly in FIGS. 4, 5 and 10 the frame 40 is located within the cover member 22 so that its outer periphery is immediately adjacent the inner surface of the cover member's sidewall 34 and is secured thereto via plural C-shaped mounting brackets 52. The brackets are secured to the sidewall 34 by respective rivets 54. The resulting construction renders the cover quite rigid and resistant to deformation so that when it is in the closed position and locked in place (as will be described later) it is resistant to being pried up to gain ingress into the truck bed.

The pair of U-shaped members 42 and 44 serve as the legs for supporting the cover member 22 in any of the open positions. To that end each of the U-shaped members is pivotally connected to the frame 40 by a pair of pivot links 56. In particular the leg 42A of front member 42 is pivotally connected to one long side of the frame 40 adjacent the front of the cover member 22 via a pivot link 56, with the upper end of that link pivotally connected to the frame by a pin 58 and with the lower end of that link fixedly connected to the leg 42A by plural pins 60. The opposite leg 42B of the U-shaped front member 42 is similarly connected to the frame 40. The legs 44A and 44B of the U-shaped rear member 44 are similarly connected to the frame 40 at the rear end thereof.

The legs 42A, 42B, 44A, and 44B are pivotally connected to the truck bed 28 via four pivot mounts 50. Those pivot mounts are mounted on the mounting brackets 48. As can be seen clearly in FIGS. 6, 7, 10 and 11 the mounting brackets 48 comprise respective elongated flanged members which are fixedly secured along the top surface of the truck's side walls 28A and 28B by plural threaded fasteners, so that each bracket extends horizontally along the truck bed, with its flanged portion being oriented vertically downward. Each of the pivot mounts 50 is in the form of a pin 64 which is secured by a screw 66 to the vertical flanged portion of a respective mounting bracket and an associated slotted, hollow socket 68. The inner end of the pin 64 includes an annular recess 70 extending through a hole 72 in the socket so that the socket is free to pivot about the longitudinal axis of the pin 64. The lower end of the socket 68 is closed by a cap 74.

The lower ends of the legs 42A, 42B, 44A, and 44B are arranged to be releasably secured in respective ones of the sockets 68. In order to hold the ends of the legs within the sockets a respective quick-release pin 76 is provided for each of the pivot mounts 50. The quick release pins are arranged to be extended through respective aligned holes 78 in the sockets 68 and in the leg portions located within those sockets.

Figure 4:
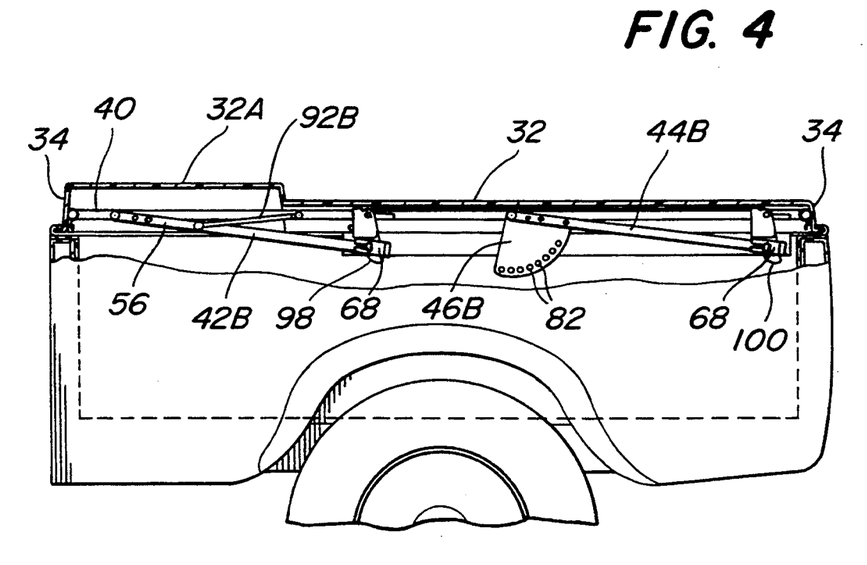
FIG. 4 is a sectional view taken along line 4—4 of FIG. 1.
Figure 6:
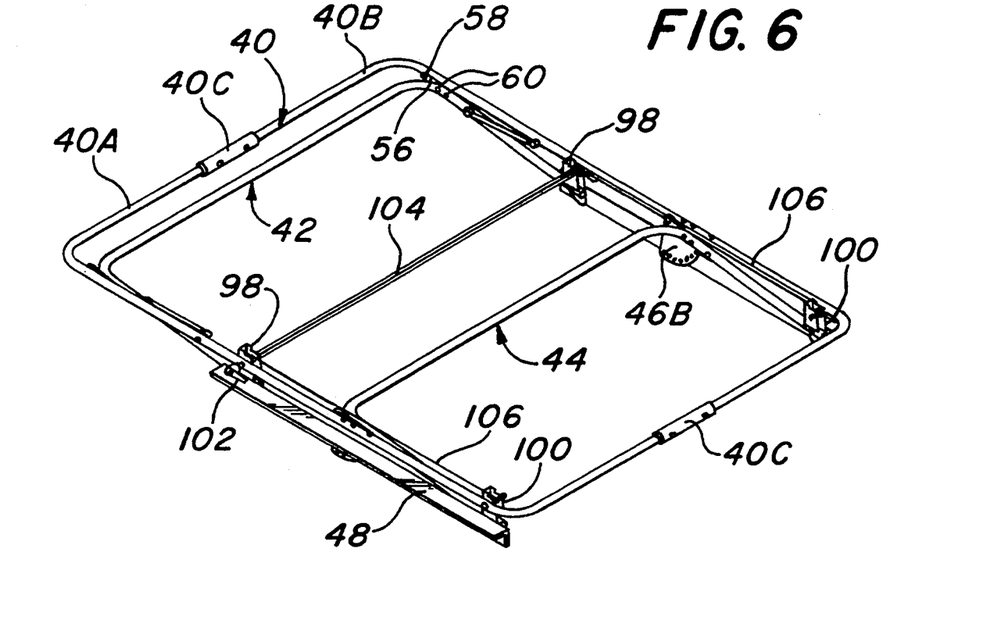
FIG. 6 is an isometric view of a portion of the cover assembly in the down or closed position.
Figure 7:
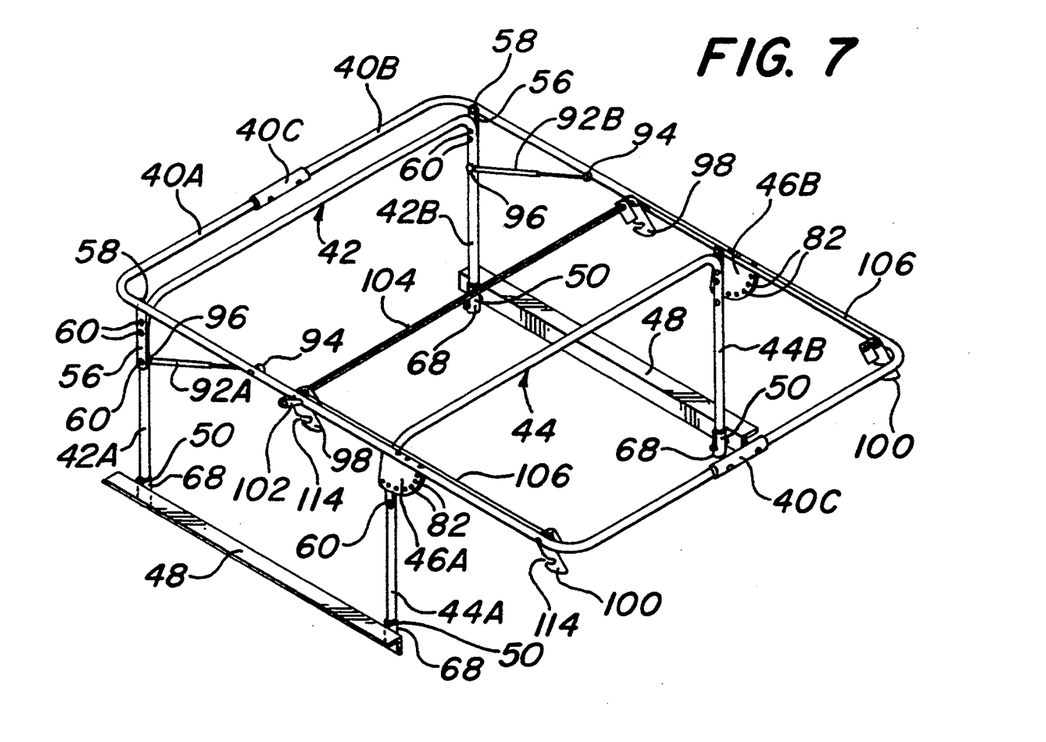
FIG. 7 is an isometric view of a portion of the cover assembly in an raised or open position.

As should be appreciated by those skilled in the art, with the U-shaped members 42 and 44 connected to the frame as just described and with the legs of the support subassembly 24 connected to the truck's sidewalls, the cover member may be lifted while remaining horizontal, whereupon its support legs will pivot with respect to the bed and the cover member from the "closed" position shown in FIGS. 4 and 6 in which the legs 42A, 42B, 44A, and 44B are approximately coplanar with the plane of the frame, to a fully extended or "open" position shown in FIG. 7 wherein the legs are oriented substantially perpendicularly to the plane of the frame 40 so that the legs are vertical. When the legs are vertical the cover member is disposed horizontally at its maximum height above the truck bed to provide the greatest degree of access under it into the interior of the bed. In fact, the legs are preferably sufficiently long, so that the cover member will be disposed a sufficient height above the ground that a person can stand under its rear end at the tail gate so that the person is shaded and/or protected from the elements.

Figure 3:
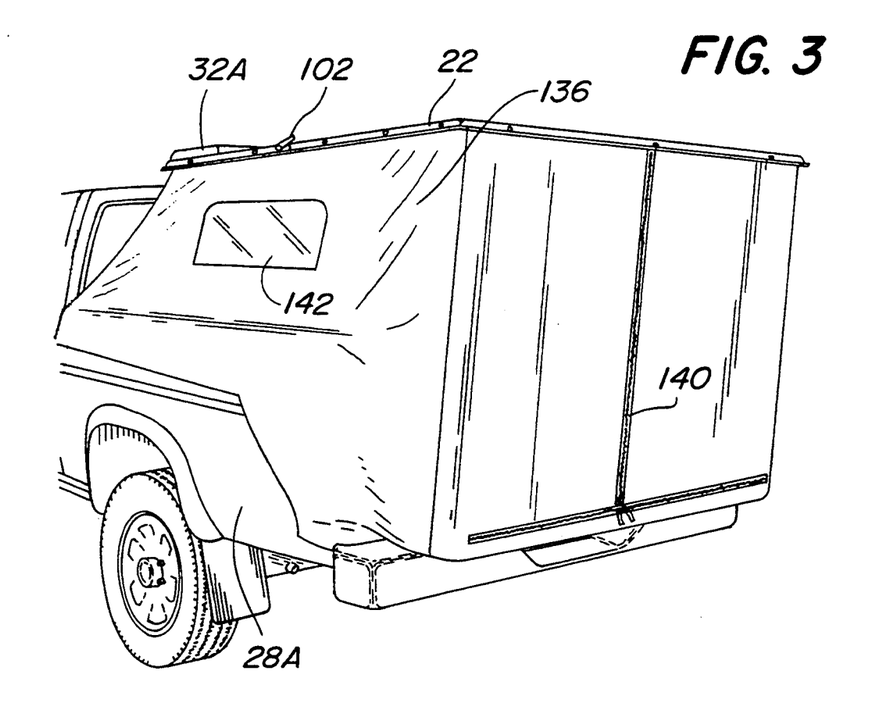
FIG. 3 is an isometric view, like that of FIG. 2, showing the cover assembly in an open or raised position supporting a tent-like enclosure thereunder.
Figure 5:
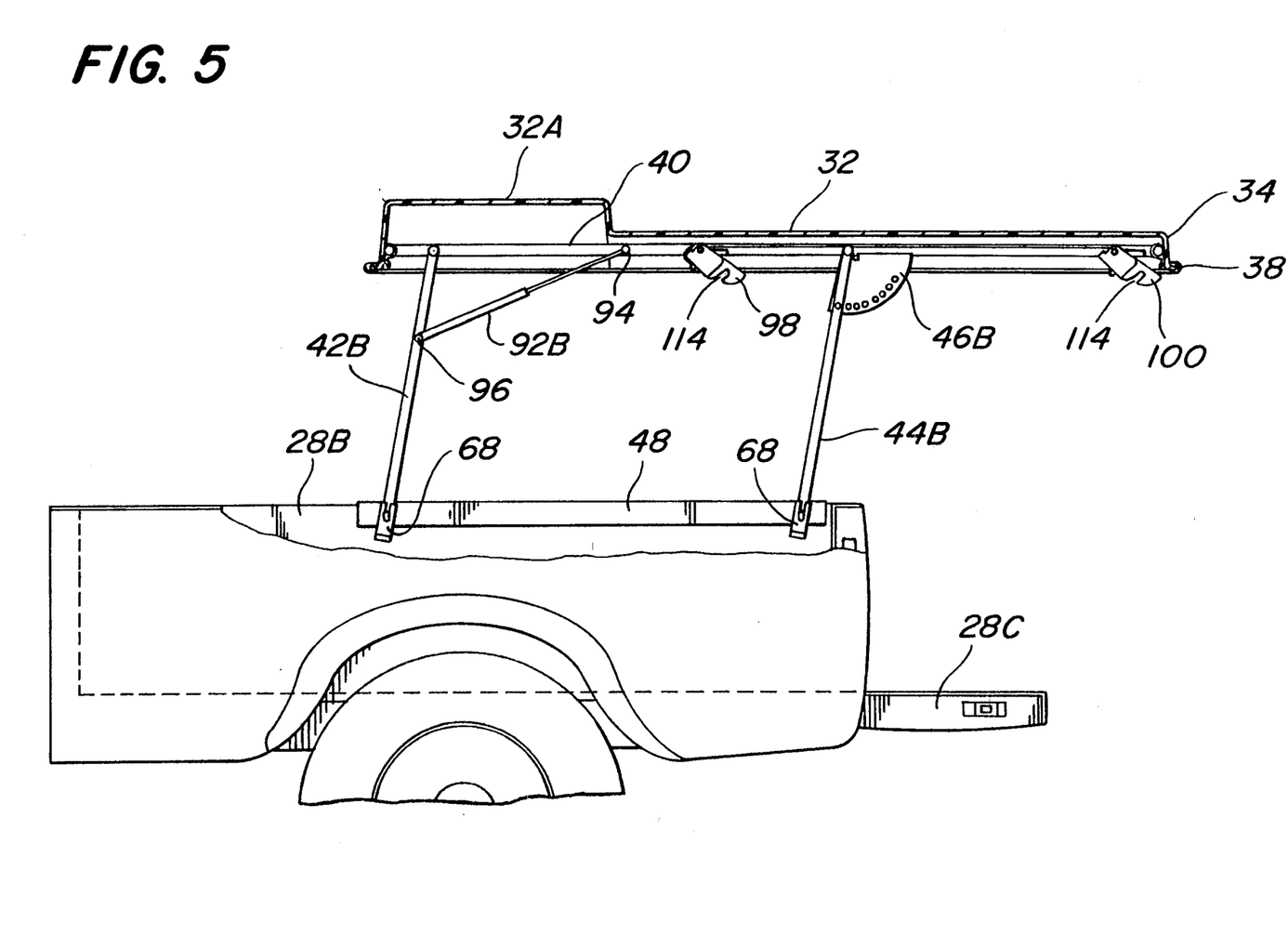
FIG. 5 is a sectional view taken along line 5—5 of FIG. 2.

It should be noted that in accordance with one aspect of this invention, and as will be discussed later, the legs supporting the cover member are arranged to be oriented past vertical when the cover member is lifted so that they can extend at a slight obtuse angle to the plane of the frame, as shown in FIGS. 2 and 5. In this orientation the cover member is not quite at the maximum height with respect to the bed, but is located a little further rearwardly over the bed than when the legs are vertical. This arrangement is useful to provide additionally shelter under the rear of the cover member, while also enabling the user to gain wider access to the bed of the truck forwardly of the front edge of the cover member 22 than if the legs were vertical (in which case the front edge of the cover member would be located closer to the truck cab). Moreover, this almost-maximum height, slight rearward orientation is also useful to serve to support a flexible housing or tent (shown in FIG. 3 and to be described later) on the cover member in order to form a sealed tent-like enclosure, e.g., to convert the truck to a "camper".

Figures 8, 9:
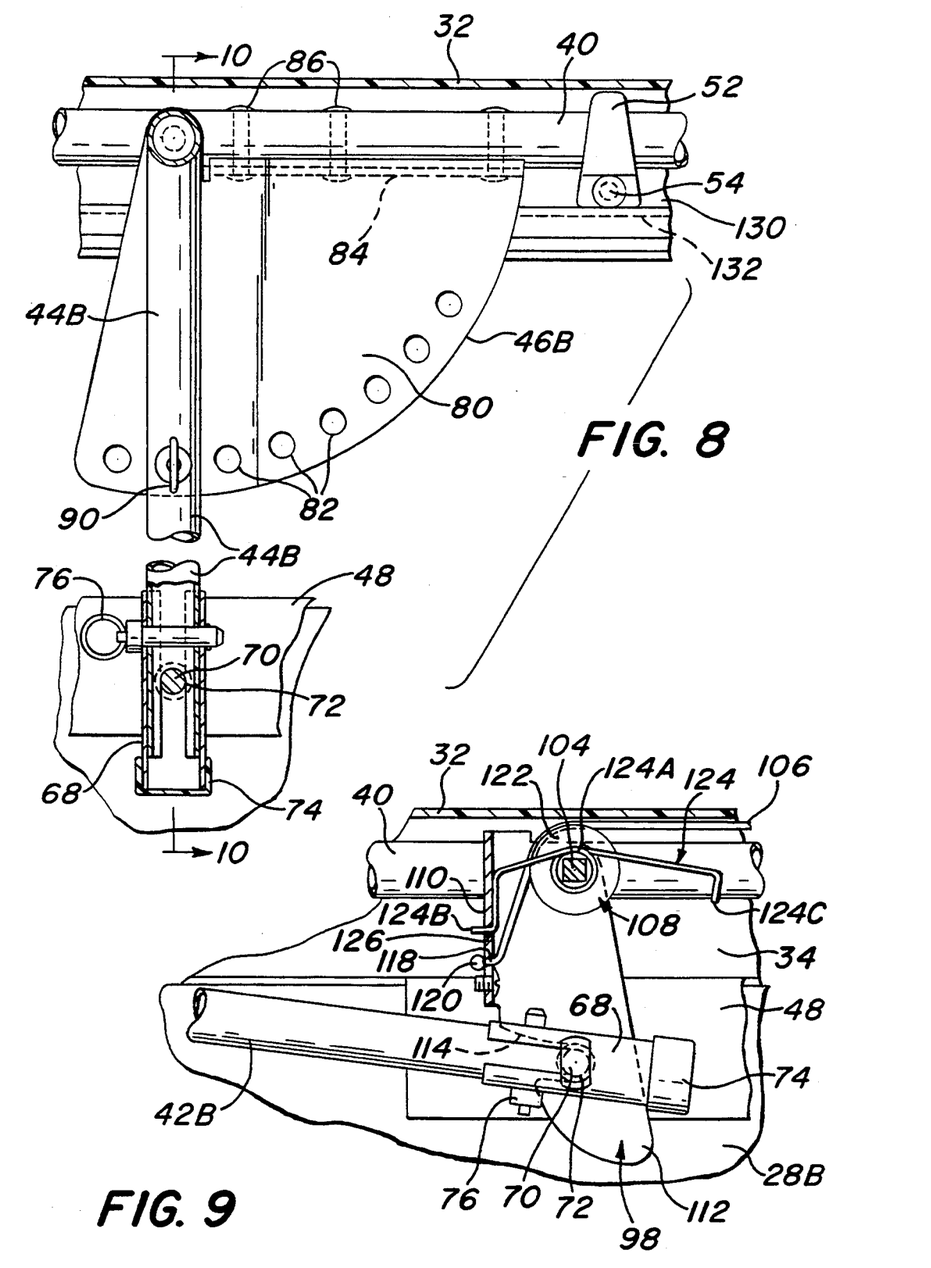
FIG. 8 is an enlarged sectional view taken along line 8—8 of FIG. 2.
FIG. 9 is an enlarged sectional view taken along line 9—9 of FIG. 1.

The means for establishing the various heights at which the cover member 22 may be disposed over the truck bed comprises the heretofore identified height adjustment mechanism 46. As can be seen in FIGS. 7 and 8 that mechanism basically comprises a pair of wedge-shaped plates 46A and 46B fixedly secured to the frame 40 adjacent the links 56 connecting the U- shaped rear member 44 to the frame. Each plate comprises a planar vertical side portion 80 which is slightly larger than the quadrant of a circle and having a quadricircular edge including a plurality of equidistantly spaced holes 82 extending therealong. A horizontally oriented mounting flange 84 is located at the top of each plate to fixedly secure that plate to the frame 40 via plural rivets 86.

A hole 88 (FIG. 10) is provided through the leg 44B adjacent to the plate 46B, and a similar hole 88 is provided through the leg 44A adjacent the plate 46A. The hole 88 in the leg 44A is arranged to be aligned with a selected one of the holes 82 in the plate 46A, while the hole 88 in the leg 44B is arranged to be aligned with a corresponding one of the holes 82 in the plate 46B to establish the angle at which the legs are oriented with respect to the horizontally extending mounting brackets 48 and cover member 22. This angle establishes the height that the cover member 22 is disposed over the truck bed.

In order to hold the cover member 22 at the desired height a pair of latch pins 90 are provided for extension through the aligned holes 82 and 88 in the height adjusting plate and corresponding leg, respectively, as shown clearly in FIGS. 8 and 10. Thus, if the cover member is to be held in the fully open position of FIG. 7 the cover member is lifted upward so that the legs pivot to the vertical orientation. At this point the next to the last hole 82 in the plates 46A and 46B will be axially aligned with the holes 88 in their associated legs 44A and 44B, respectively, so that the pins 90 can be extended therethrough to secure the cover member in place at the maximum height. If the cover member is to be held in the position shown in FIGS. 2 and 5 the cover member is lifted upward so that the legs pivot past the vertical orientation until the last hole 82 in the plates 46A and 46B will be axially aligned with the holes 88 in their associated legs 44A and 44B, respectively, so that the pins 90 can be extended therethrough. If it is desired to adjust the height of the cover to some intermediate open position all that is required is to remove the pins 90 from the aligned holes and lift or lower the cover member (as the case may be) until a desired hole 82 in one of the plates is aligned with the hole in the associated leg and the corresponding hole 82 in the other plate is aligned with the hole in the associated leg. The pins 90 can then be inserted in the aligned holes to secure the cover at the desired height.

As can be seen in FIGS. 2–7 a pair of gas piston, dash-pots 92A and 92B are provided as a part of the mounting/support subassembly 24 in order to facilitate the lifting of the cover member 22 by the user. In particular, the piston end portion 94 of the dash pot 92A is pivotally connected the side of the frame 40 at the interface of the leg 42A and the bottom of the associated link 56, while the cylinder end portion 96 of that dash pot is pivotally connected to the leg 42A. In a similar manner the piston end 94 portion of the dash pot 92B is pivotally connected the side of the frame 40 at the interface of the leg 42B and the bottom of the associated link 56, while the cylinder end portion 96 of that dash pot is pivotally connected to the leg 42B.

In order to lock or secure the cover member 22 in the closed position so that unauthorized access to the interior of the truck bed can not be accomplished the cover assembly 20 includes the heretofore identified locking subassembly 26. That subassembly can best be seen in FIGS. 4, 5, 6, 7, 9 and 11 and basically comprises a pair of front latches 98 (FIG. 9), a pair of rear latches 100 (FIG. 11), an actuating handle 102 (FIGS. 1, 2 and 7), a connecting shaft or bar 104 (FIG. 7), a pair of latch actuating cables 106 (FIGS. 6 and 7), and four spring biasing mechanisms 108 (FIGS. 9 and 11). As can be seen clearly in FIG. 7 the shaft 104 extends between the sides of the frame 40 approximately half way between the U-shaped members 42 and 44. The shaft 104 is of square cross section, except for its ends, which are circular and which are journalled in circular holes (not shown) in the sides of the frame 40. The handle 102 is fixedly secured to the end of the shaft 104 at the frame section 40A so that the shaft can be pivoted about its longitudinal axis by grasping the handle 102 and rotating it in the desired direction. The front latches 98 are fixedly secured on the shaft 104 just inside their respective sides of the frame 40. Each latch comprises an top flanged mounting portion 110 from which an elongated ear 112 extends downwardly. The shaft 104 extends through a square opening (not shown) in the top of the ear and is secured in place, e.g., welded, so that the latch is fixedly secured to the shaft. The other front latch is similarly connected to the shaft so that rotation of the shaft 104 by the handle 102 causes concomitant rotation of both of the front latches 98.

Each of the latches 98 includes a recess or mouth 114 which is arranged to receive therein the portion 116 (FIG. 10) of the pin 70 located between the pivotable socket 68 and the vertical flange of the mounting bracket 48 when the cover member is in its closed position and when those latches are pivoted in the clockwise direction by rotation of the handle 102 in that direction. This action effectively locks the front end of the cover in the closed position. The rear latches are constructed identically to the front latches, and thus their construction will not be reiterated herein. Suffice it to state that the rear latches 100 are not mounted on a common shaft like the front latches. Instead each of the rear latches 100 is pivotally mounted via a short pin (not shown) onto a respective side of the rectangular frame 40 adjacent the rear end thereof. The rear latch 100 on one side of the frame 40 is connected to the front latch 98 on that side of the frame by a taut cable 106. In a similar manner the rear latch 100 on the other side of the frame is connected to the front latch 98 on that other side of the frame by another taut cable 106. Thus, as can be seen in FIGS. 9 and 11 the front end of one cable 106 extends through a hole 118 in the flanged portion 110 of one front latch 98. The free end 120 of the front of the cable 106 is bulbous so that it cannot slide out of the hole 118. That cable 106 extends over a roller 122 (which forms a portion of the spring biasing mechanism, to be described later, and associated with that latch) down the associated long side of the frame 40 to the associated rear latch 100, where it passes over another roller 122. This other roller forms a portion of the spring biasing mechanism for the rear latch. The cable 106 extends and through the hole 118 in the flanged portion 110 of that latch 98 and its free end 120 is also bulbous so that it cannot slide out of that hole 118. The front and rear latches on the other side of the frame are connected together in an identical manner.

The spring biasing mechanisms are identical and each basically comprises the heretofore identified roller 122 and a tension spring 124. The spring 124 includes a hollow helical coil central portion 124A and a pair of end portions 124B and 124C. The end portion 124B of the spring extends through a hole 126 in the flanged portion 110 of the associated latch 98 or 100. The other end portion 124C of the spring terminates in an arcuate free end which receives and engages a portion of the circular periphery of the frame 40 (see FIG. 9).

The hollow helical central portion of the two springs associated with the front latches 98 are adapted to have the rod 104 extend therethrough, while those portions of the springs associated with the rear latches 100 are adapted to have the pins pivotally mounting those latches on the frame extending therethrough.

All of the springs are biased so that they automatically tend to rotate the latches to the locked position, i.e., the position in which the portions 116 of the pins 70 are received in their respective recesses 114. Accordingly, when the latches are in this position the cover member 22 cannot be lifted. In order to release the latches so that the cover panel can be lifted all that is required is to rotate the handle 102 in the counterclockwise direction, whereupon that motion will be coupled via the shaft 102 to the front latches 98 against the bias of the associated springs so that the front latches will pivot in unison in the counterclockwise direction, thereby releasing the rods 70 from their recesses 114. At the same time the taut cables 106 will transmit the counterclockwise rotation of the handle to the rear latches, against the bias of their springs, whereupon the rear latches will release their rods. Accordingly, all of the latches will be released and the cover will be free to be lifted horizontally off of the bed. One or more lifting handles (not shown) may be secured to the cover member to assist the user in lifting it.

As mentioned earlier the cover assembly 20 may be used to form an enclosure or tent for persons in the truck bed so that the truck can be used as a "camper" or similar type vehicle. To that end the mounting/support subassembly 24 includes a track rail 128 (FIG. 10) extending along the periphery of the frame 40 slightly below it. The track rail is an elongated member which is of generally "h-shape" in cross section to define a mounting tab 130 and a downwardly depending arcuate groove 132. The track rail is fixedly secured to the inner surface of the cover member's sidewall 34 via the rivets 54 used to secure the frame clamps 52 to the cover member. The track rail 128 is mounted so that its peripheral groove 132 is directed downward in order to releasably receive a bead 134 (shown in phantom in FIG. 10) of an optional curtain 136. The curtain 136 may be formed of any suitable material, e.g., waterproof canvas, nylon, or other fabric, or plastic, and is shaped so that when the cover member 22 is in its open position, like shown in FIGS. 2 and 5, and the curtain 136 suspended therefrom by snap fitting the curtain's bead 134 within the track rails's groove 132, the curtain forms an enclosure or tent with the truck bed and tailgate. The curtain includes fastening means (not shown) for securing it to the body of the truck, e.g., to portions of the sidewalls and tailgate, to complete the enclosure or tent. Access to the enclosure or tent is provided by a zippered passageway 140. The curtain forming the enclosure preferably also includes transparent windows 142, formed of any suitable material, e.g., a plastic.

Without further elaboration the foregoing will so fully illustrate my invention that others may, by applying current or future knowledge, adapt the same for use under various conditions of service.

I claim:

1. A liftable cover assembly for the bed of a truck, the truck having sidewalls and a tail gate, said cover assembly comprising a cover member, plural support legs for said cover member, height establishing means, first coupling means, second coupling means, and locking means, each of said support legs being an elongated member arranged to be pivoted to an inclined angular orientation and having a lower end pivotally connected about a horizontal axis to a respective one of the sidewalls by said first coupling means, said elongated member having an upper end pivotally connected by said second coupling means to said cover member at a fixed position on said cover member to enable said cover member to be lifted horizontally from a closed position to an open position, said cover member when in said closed position being horizontally disposed over said bed on said sidewalls and said tailgate with said support legs being positioned substantially parallel to said cover member so that they do not extend substantially into the bed, said cover member when in said open position, being disposed and held horizontally at a selected one of a plurality of predetermined distances above the sidewalls, said height establishing means being coupled by means to at least one of said support legs to releasably secure said at least one support leg in a predetermined desired angular orientation to establish said selected one of said plurality of predetermined distances, said locking means being actuatable to lock said cover member in said closed position and to unlock said cover member from said closed position so that it can be raised to said open position.

2. The cover assembly of claim 1 wherein said support legs are releasably secured to said sidewalls by said first coupling means to enable said support legs and said cover member to be removed as a unit from said truck bed.

3. The cover assembly of claim 1 additionally comprising frame means extending about the periphery of said cover member and securement means therefor, said plural support legs comprising a pair of generally U-shaped members, each of said U-shaped members comprising a pair of said elongated members and being pivotally connected to said frame means by said second coupling means.

4. The cover assembly of claim 1 wherein said height establishing means comprises pin means and a plate fixedly secured to said cover member adjacent an associated one of said support legs, said plate having plural holes therein, said associated one of said support legs having an opening therein, said opening in said support leg being arranged to be aligned with respective ones of said holes in said plate whereupon said pin can be located therein to establish respective angled orientations of said support leg.

5. The cover assembly of claim 4 wherein said cover assembly comprises a pair of generally U-shaped members, each of said U-shaped members having a pair of legs, said legs of said U-shaped members forming said support legs, and wherein said height establishing means comprises a pair of said plates, with each of said plates being associated with a respective one of the support legs of one of said pair of U-shaped members.

6. The cover assembly of claim 1 wherein said cover member is formed of a rigid self-supporting material and is of a size sufficient to completely close said truck bed when said cover member is in said closed position.

7. The cover assembly of claim 6 wherein said locking means comprises plural latches located at spaced apart positions adjacent the periphery of said cover member and coupled to one another so as to be actuatable in unison to lock and unlock said cover member to said sidewalls.

8. The cover assembly of claim 7 wherein said locking means comprises handle means and cable means, said handle means and said cable means being coupled together and to said plural latches.

9. The cover assembly of claim 8 wherein each of said latches comprises a pin fixedly secured to said sidewall and pivotable member having a recess therein mounted on said cover member, said pivotable member being arranged to be pivoted by said handle to an orientation wherein said pin is located within said recess.

10. The cover assembly of claim 1 additionally comprising lift assistance means to assist the manual lifting of said cover member from said closed position to said open position.

11. The cover assembly of claim 10 wherein said lift assistance means comprises at least one gas-operated piston.

12. The cover assembly of claim 11 wherein said cover assembly comprises a pair of generally U-shaped members, each of said U-shaped members having a pair of legs, said legs of said U-shaped members forming said support legs, and wherein said lift assistance means comprises a pair of gas-operated pistons, with one of said gas-operated pistons being coupled between said cover member and one leg of one of said U-shaped members, and with the other of said gas-operated pistons being coupled between said cover member and the other leg of said one of said U-shaped members.

13. The cover assembly of claim 1 additionally comprising mounting means and at least one side panel, said mounting means mounting said side panel to said cover member when said cover member is in said open position to form an enclosure encompassing said truck bed and the space under said cover member.

14. The cover assembly of claim 13 wherein said side panel forms a tent-like member.

15. The cover assembly of claim 14 additionally comprising frame means extending about the periphery of said cover member and secured thereto, said mounting means being connected to said frame means, said mounting means including at least one elongated recess therein, said tent like member having an upper edge in the form of a bead adapted to be snap-fit within said elongated recess to suspend said tent-like member therefrom.

16. The cover assembly of claim 2 additionally comprising mounting means for permanent securement to said sidewalls, said mounting means comprising plural sockets, each of said sockets being pivotable about a respective horizontal axis and adapted to releasably receive therein a respective one of said support legs.

* * * * *